United States Patent [19]

Yagi et al.

[11] Patent Number: 4,596,214

[45] Date of Patent: Jun. 24, 1986

[54] COMBUSTION CHAMBER SYSTEM FOR KEROSINE INTERNAL COMBUSTION ENGINE

[75] Inventors: Shizuo Yagi, Asaka; Junji Ootani, Oomiya; Masafumi Araki, Kawagoe; Fumihiko Yoshida, Kodaira, all of Japan

[73] Assignee: Honda Giken Kabushiki Kaisha, Japan

[21] Appl. No.: 692,738

[22] Filed: Jan. 18, 1985

[30] Foreign Application Priority Data

Feb. 1, 1984 [JP] Japan .................................. 59-16707
Feb. 1, 1984 [JP] Japan .................................. 59-16708
Feb. 28, 1984 [JP] Japan ............................ 59-27715[U]

[51] Int. Cl.⁴ ........................ F02B 19/12; F02B 19/18
[52] U.S. Cl. .................................... 123/260; 123/268; 123/293
[58] Field of Search ............... 123/254, 255, 265, 268, 123/274, 286, 293, 260, 282

[56] References Cited

U.S. PATENT DOCUMENTS

| | | | |
|---|---|---|---|
| 2,024,462 | 12/1935 | Mack | 123/268 X |
| 3,908,624 | 9/1975 | Miyake et al. | 123/276 X |
| 3,967,595 | 7/1976 | Yagi et al. | 123/265 X |
| 4,029,075 | 6/1977 | Noguchi et al. | 123/268 |
| 4,092,969 | 6/1978 | Ono et al. | 123/268 |
| 4,119,065 | 10/1978 | Noguchi et al. | 123/285 X |
| 4,170,968 | 10/1978 | Noguchi et al. | 123/260 |
| 4,218,992 | 8/1980 | Latsch et al. | 123/293 X |
| 4,444,166 | 4/1984 | Kovacs et al. | 123/254 X |

*Primary Examiner*—Tony M. Argenbright
*Attorney, Agent, or Firm*—Armstrong, Nikaido, Marmelstein & Kubovcik

[57] ABSTRACT

A combustion chamber system of a kerosine internal combustion engine including a main combustion chamber and an auxiliary combustion chamber both of which are defined in a cylinder head and are spaced from each other by a partition. A plurality of communication holes through which these main and auxiliary combustion chambers communicate with each other are made in the partition. The main combustion chamber has a suction port and an exhaust port opened thereto which are adapted to be opened and closed by a suction valve and an exhaust valve, respectively. The open ends of the communication holes on the side of the main combustion chamber are pointed to the upper surface of a piston located in the vicinity of a top dead center thereof, and a mixture of a theoretical or richer fuel ratio is fed into the main combustion chamber.

14 Claims, 10 Drawing Figures

COMBUSTION CHAMBER SYSTEM FOR KEROSINE INTERNAL COMBUSTION ENGINE

BACKGROUND OF THE INVENTION

1. Field of the Invention

The present invention relates to a combustion chamber system for an internal engine using a kerosine as a fuel, which has an excellent power performance and a simple structure.

2. Description of the Prior Art

It is generally known in an internal combustion engine that in any kinds of fuel one effective means for increasing a thermal efficiency to improve a specific fuel consumption and a power output is to increase the compression ratio of engine. However, it is also known that a too high compression ratio causes knocking (abnormal combustion) which may rather bring about reduction in power.

Because kerosine has a lower octane value than that of gasoline, a kerosine internal combustion engine tends to cause knocking as compared with a gasoline internal combustion engine and has a compression ratio limited lower. For reasons of inexpensiveness, excellence in economy and ease to deal with, however, it is desired to develop a high power and high performance kerosine engine having an increased compression ratio with an occurrence of knocking suppressed.

Knocking phenomenon is generally said to be caused by a rapid spontaneous ignition of an unburnt end gas i.e., a final part of the mixture to be burned to the flame propagation. Requirements for inhibiting the knocking include:

(1) increasing a flame speed to raise a combustion speed; and (2) shortening the distance of flame propagation. It is also known that an engine having an auxiliary combustion chamber relatively well meets the above requirements and has an excellent antiknocking property.

However, any conventional engine having an auxiliary combustion chamber is aimed at reducing air pollution by a lean burn method and is unavoidably complicated in structure and costly. There has not yet been put into practical use such a high power kerosine engine having a good specific fuel consumption and having a simple structure wherein a high compression ratio is obtainable and occurrence of knocking is inhibited to a possible extent while a combustion efficiency is enhanced.

SUMMARY OF THE INVENTION

It is therefore an object of the present invention to provide a combustion chamber system for a kerosine internal combustion engine, wherein an occurrence of knocking is inhibited to a possible extent while setting a compression ratio at a higher level than the prior art devices, so that it can have an excellent power performance and a good specific fuel consumption, and further needs only a small number of parts, thereby rendering the cost low.

According to the present invention, this object is accomplished by providing a combustion chamber system for a kerosine internal combustion engine, comprising: a cylinder head; a piston; a main combustion chamber defined by a lower surface of the cylinder head and an upper surface of the piston; an auxiliary combustion chamber defined within the cylinder head and spaced from the main combustion chamber by a partition; a fuel feeding means for feeding an air-fuel mixture of a theoretical or richer fuel ratio to the main combustion chamber; a suction port and an exhaust port adapted to be opened and closed by a suction valve and an exhaust valve, respectively; an ignition plug provided in the auxiliary combustion chamber; and a plurality of communication holes formed in the partition to provide communication between the main combustion chamber and the auxiliary combustion chamber, wherein the respective open ends of the communication holes located on the side of the main combustion chamber are pointed to the upper surface of the piston positioned near a top dead center thereof.

With this arrangement, a compressed inflammable air-fuel mixture having a theoretical or richer fuel ratio which has been drawn into the main combustion chamber is injected into the auxiliary combustion chamber and is burnt by a spark ignition. The burnt gas expanded under high temperature is injected into the main combustion chamber through the plurality of communication holes to spread from the upper surface of the piston located near the top dead center over a wide region. Thus, the mixture in the main combustion chamber can be burnt extremely rapidly with a short distance of flame propagation. Therefore, a high power kerosine engine can be provided wherein occurrence of knocking is suppressed to a possible extent to enhance a compression ratio and the specific fuel consumption is improved.

In addition, the suction and exhaust valves, a mechanism for operating these valves and a fuel feeding means are to be provided only in the main combustion chamber, reducing the number of components as compared with conventional engines having auxiliary combustion chambers and simplifying the structure. Thus, in cooperation with use of inexpensive kerosine fuel, a high output engine can be obtained at an extremely low cost.

In addition to the above arrangement, according to the present invention, the auxiliary combustion chamber may be defined by a bottomed bore formed on one side of the cylinder head and a stop plug blocking the open end of the bottomed bore, and the open ends of the plurality of communication holes on the side of the auxiliary combustion chamber may be disposed near an electrode of the ignition plug. This arrangement enables such an auxiliary combustion chamber of a small volume to be formed easily in the cylinder head. Therefore, the manufacturing cost of the cylinder head can be reduced and further, the interior of the auxiliary combustion chamber can be easily cleaned by removing the stop plug.

Further, according to the present invention, a recess may be formed in the partition separating the main and auxiliary chambers so as to be concave from the main combustion chamber toward the auxiliary combustion chamber, the communication holes through which the main and auxiliary combustion chambers communicate with each other may be perforated from the recess, and the peripheral edge defining the open end of the recess on the side of the main combustion chamber may be formed in a radius surface which is smoothly connected to the wall surface of the main combustion chamber. This arrangement enables the perforation of the communication holes to be extremely facilitated and the working efficiency of perforation of the communication holes to be considerably enhanced, leading to a cost reduction.

In addition, although the partition separating the main combustion chamber from the auxiliary combustion chamber is normally formed of a sufficient large thickness for ensuring a predetermined strength, however, the above arrangement allows the communication holes, perforated in the partition, to be made very short, and therefore undesirable cooling of the flame passing through the communication holes by the wall surface of the communication holes can be suppressed, thus eliminating the possibility of the flame being extinguished.

Moreover, since it is suggested that no sharp edge exists in the recess, a thermal conduction at the recess to the cylinder head is maintained at a good level to reduce the production of a heat spot to minimum, making it possible to prevent knocking from occurring due to the production of a heat spot.

The above and other objects, features and advantages of the present invention will become apparent from the following detailed description of the preferred embodiments when taken in conjunction with the accompanying drawings.

DESCRIPTION OF PREFERRED EMBODIMENTS

Figure 1:
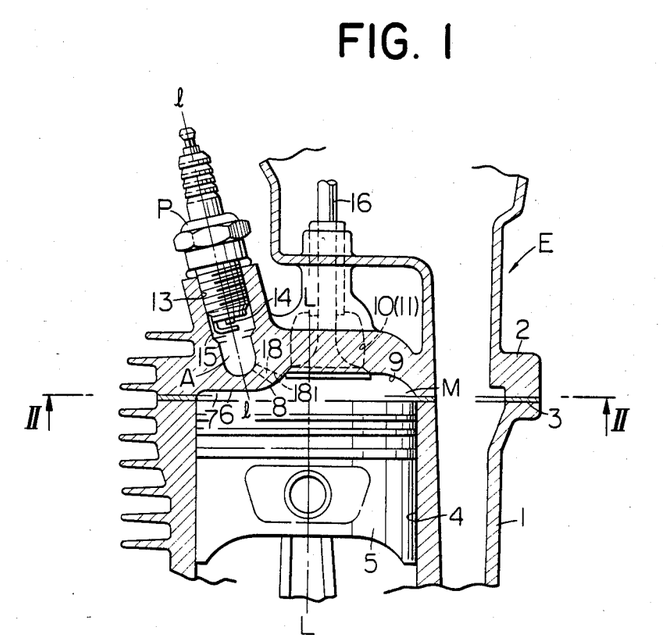
FIG. 1 is a vertical sectional side view of a combustion chamber system of a first embodiment according to the present invention.
Figure 2:
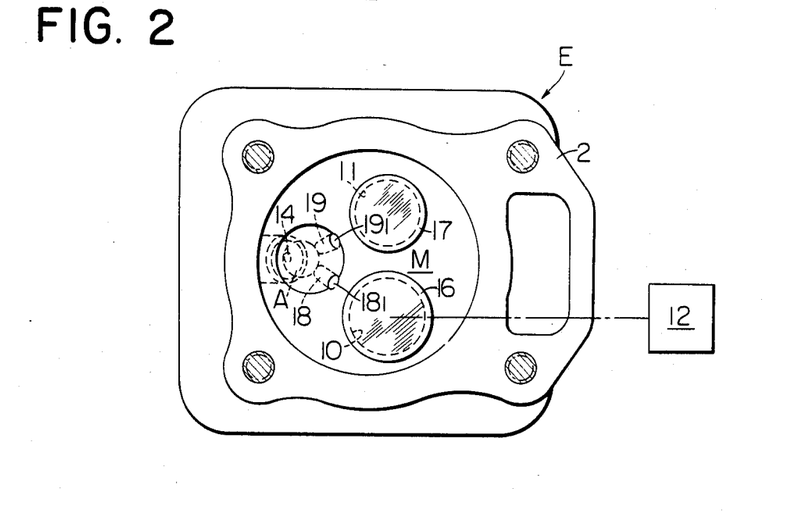
FIG. 2 is a bottom view of a cylinder head, taken along the line II—II in FIG. 1.

Referring first to FIGS. 1 and 2, there is shown a combustion chamber system of a first embodiment according to the present invention, which is embodied in an engine of an overhead valve type (OHV type). Body E of a 4-cycle kerosine internal combustion engine includes a cylinder block 1 and a cylinder head 2 placed on and connected to the cylinder block 1 with a gascket 3 between them. The cylinder block 1 includes a piston 5 which is slidably fitted in a cylinder 4 defined therein. The cylinder head 2 includes a main combustion chamber M confronting the upper surface of the piston 5 and an auxiliary combustion chamber A of a small volume defined on one side of and above the main combustion chamber M, spaced from the latter by a partition 6. The wall of the main combustion chamber M is integrally formed with the wall of the auxiliary combustion chamber A.

The main combustion chamber M has, below the auxiliary combustion chamber A, a squish part 7 whose upper surface is smoothly connected to a ceiling surface 9 of the main combustion chamber M through an inclined surface 8. The ceiling surface 9 has a suction port 10 and an exhaust port 11 both of which are opened therein side-by-side. The suction port 10 has a diameter slightly larger than that of the exhaust port 11. The suction port 10 communicates with a suction system provided with a fuel feeding means 12 such as a carburetor, fuel injection valve or the like. The fuel feeding means 12 supplies an inflammable air-fuel mixture having a theoretical or slightly higher air fuel ratio to the main combustion chamber M.

The auxiliary combustion chamber A is cylindrically shaped with a spherical lower surface, and has a longitudinal axis l—l which is inclined relative to a longitudinal axis L—L of the cylinder 4 so as to intersect the latter at a point downward. In the upper portion of the auxiliary combustion chamber A, there is a threaded bore 13 which has an upper side end opened. An ignition plug P is screwed into the threaded bore 13 and has an electrode 14 facing to a plug chamber 15 defined in the upper portion of the auxiliary combustion chamber A. The auxiliary chamber A has a diameter not exceeding the major diameter of the threaded bore 13.

The suction and exhaust ports 10 and 11 are adapted to be opened and closed respectively by a suction valve 16 and an exhaust valve 17 both of which are slidably carried by the cylinder head 2. The suction and exhaust valves 16 and 17 are shiftable by a conventional valve-operating mechanism not shown.

The partition 6 separating the main and auxiliary combustion chambers from each other has two communication holes 18 and 19 made therein through which the chambers M and A communicate with each other. The two communication holes 18 and 19 each are gradually widened or diverge toward the main combustion chamber M, and the distance between both the holes is similarly gradually increased. The respective open ends $18_1$ and $19_1$ of the communication holes 18 and 19 on the side of the main combustion chamber M are formed to be pointed to parts of the upper surface of the piston 5 located below respective suction and exhaust valves 16 and 17 when the piston 5 is near its top dead center, so that the burnt gas from the auxiliary combustion chamber A which will be described hereinbelow can be rapidly injected into the main combustion chamber M over a wider region thereof.

The following is the description of operation of the combustion chamber system according to the first embodiment of the present invention shown in FIGS. 1 and 2.

When the engine is now operated, the suction stroke of the piston 5 in which it is moved down causes a mixture of a theoretical or slightly richer fuel ratio to be drawn from the fuel feeding means 12 into the main combustion chamber M. The subsequent compression stroke of the piston 5 where the piston is moved up causes a part of the mixture as having been drawn into the main combustion chamber M to flow into the auxiliary combustion chamber A via the two communication holes 18 and 19. At a point close to the completion of the compression stroke, the spark ignition of ignition plug P is effected to first fire the mixture near the electrode 14 within the auxiliary combustion chamber A, then the combustion flame is propagated to the whole mixture existing in the auxiliary combustion chamber A as surrounding the electrode 14. The burnt gas is expanded by the temperature rise, starting to be injected through the two communication holes 18 and 19 into the main combustion chamber M toward the parts of the upper surface of the piston 5 located below the respective suction and exhaust valves 16 and 17 when the piston 5 is located in the vicinity of its top dead center. In the auxiliary combustion chamber A, the internal temperature is still more remarkably raised and the burnt gas further continues to expand so as to be continuously and forcibly injected into the main combustion chamber M through the two communication holes 18 and 19, thereby spreading over the entire area of the main chamber M. Thus, the combustion is extremely rapidly completed at an increased speed.

In the combustion procedure described above, the flame from the auxiliary combustion chamber A is radially injected into the main combustion chamber M through the communication holes 18 and 19 so that the flame is rapidly propagated over the entire area in the main combustion chamber M from their injection course as a base point to realize more rapid burning of the unburnt mixture in the main combustion chamber M.

From the above, it follows that the flame speed is increased to raise the combustion speed and the distance of flame propagation is reduced, which are primary factors for suppressing knocking. Thus, the occurrence of knocking can be suppressed even if the compression ratio is set at a higher level as compared with conventional kerosine engines.

Figure 3:
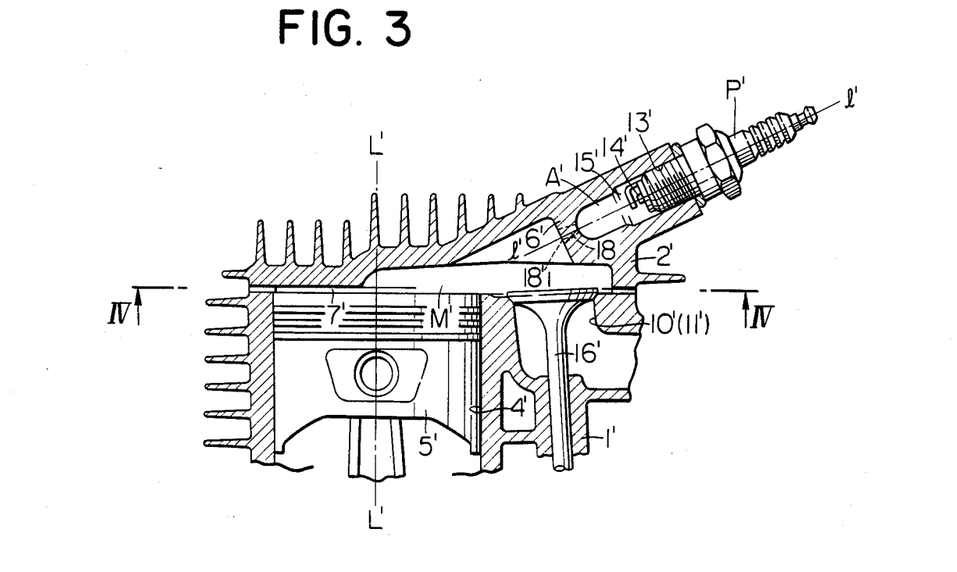
FIG. 3 is a vertical sectional side view of a combustion chamber system of a second embodiment according to the present invention.
Figure 4:
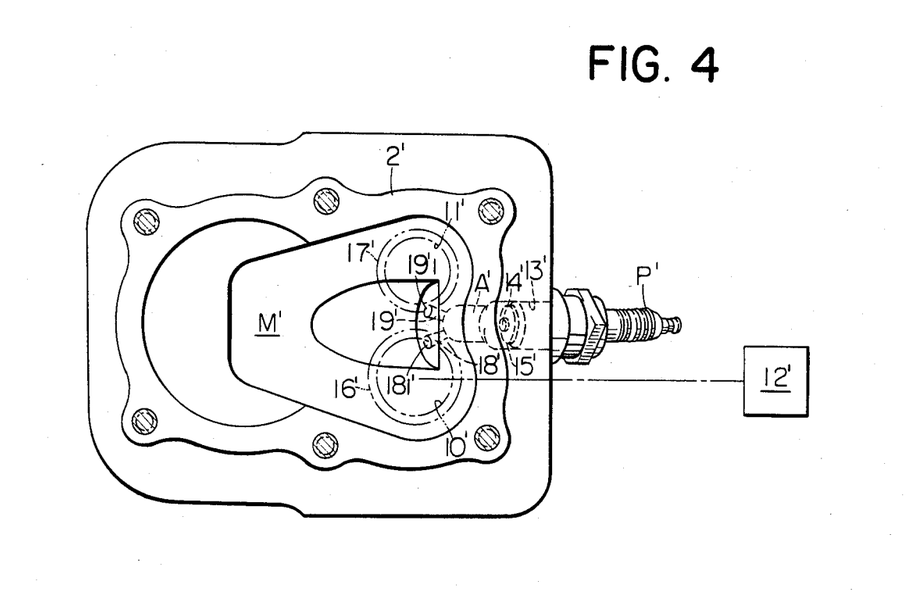
FIG. 4 is a bottom view of a cylinder head, taken along the line IV—IV in FIG. 3.

Next referring to FIGS. 3 and 4, there is shown a combustion chamber system of a second embodiment according to the present invention, which is embodied in an engine of a side valve type (SV type). In a cylinder block 1', there are formed a suction port 10' and exhaust port 11' side-by-side on one side of a cylinder 4'. These ports 10' and 11' are opened in the upper surface of the cylinder block 1'. A cylinder head 2' includes a main combustion chamber M' defined therein to extend over the upper surface of a piston 5' and the open ends of the suction and exhaust ports 10' and 11', and an auxiliary combustion chamber A' of a small volume defined in the head 2' above the main combustion chamber M' on the side of the ports 10' and 11', spaced from the main chamber M' by a partition 6'.

The main combustion chamber M' includes a squish part 7' of a relatively larger area above the piston 5 on one side opposite to the auxiliary combustion chamber A', and gradually increases in volume from the portion above the piston 5' toward the suction and exhaust ports 10' and 11'.

A fuel feeding means 12' such as carburetor similar to that of the first embodiment is connected to the main combustion chamber M'.

The auxiliary combustion chamber A' is formed into the same shape as in the first embodiment. The vertical axis l'—l' of the auxiliary chamber A' is inclined to intersect the vertical axis L'—L' of the cylinder 4' at a downward point, but the inclination angle thereof in respect to the horizontal plane is less than that as in the first embodiment. The auxiliary combustion chamber A' is provided with a plug chamber 15' and a threaded bore 13' at the upper portion of the chamber A'. An ignition plug P' is screwed into the bore 13'. An electrode 14' of the plug P' is located within the ignition plug chamber 15'.

The suction and exhaust ports 10' and 11' are adapted to be opened and closed by suction and exhaust valves 16' and 17', respectively.

In the partition 6' separating the main combustion chamber M' from the auxiliary combustion chamber A', there are made two communication holes 18' and 19' through which the chambers M' and A' communicate with each other. The open ends $18_1'$ and $19_1'$ of the communication holes 18' and 19' which are open to the main combustion chamber M' are located just above the suction and exhaust valves 16' and 17', respectively. The communication holes 18' and 19' are also gradually widened toward, namely, diverge toward the main combustion chamber M' and gradually increase in the distance between both of them, as in the first embodiment described above. Further, the respective open ends $18_1'$ and $19_1'$ of the two communication holes 18' and 19' on the side of the main combustion chamber M' are oriented to the upper surface of the piston 5' positioned at its top dead center.

In this second embodiment, the operation is also conducted in the same procedure as in the first embodiment.

Although in the first and second embodiments, the two communication holes are provided in the partition (6; 6') separating the main combustion chamber (M; M') from the auxiliary combustion chamber (A; A'), three or more communication holes may be made in the partition (6; 6').

Figure 5:
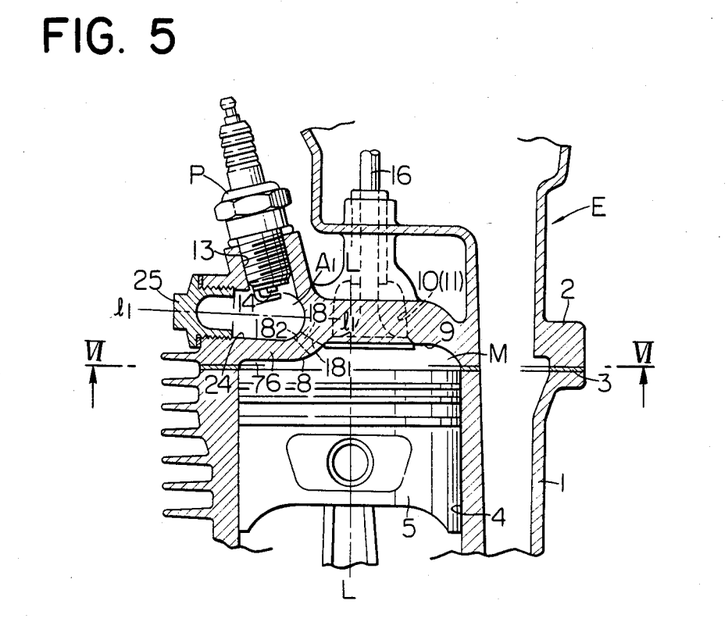
FIG. 5 is a vertical sectional side view of a combustion chamber system of a modification of the first embodiment.
Figure 6:
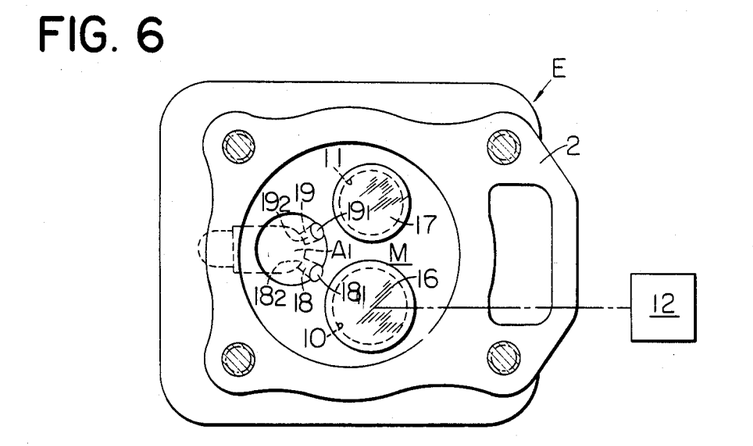
FIG. 6 is a bottom view of a cylinder head, taken along the line VI—VI in FIG. 5.
Figure 7:
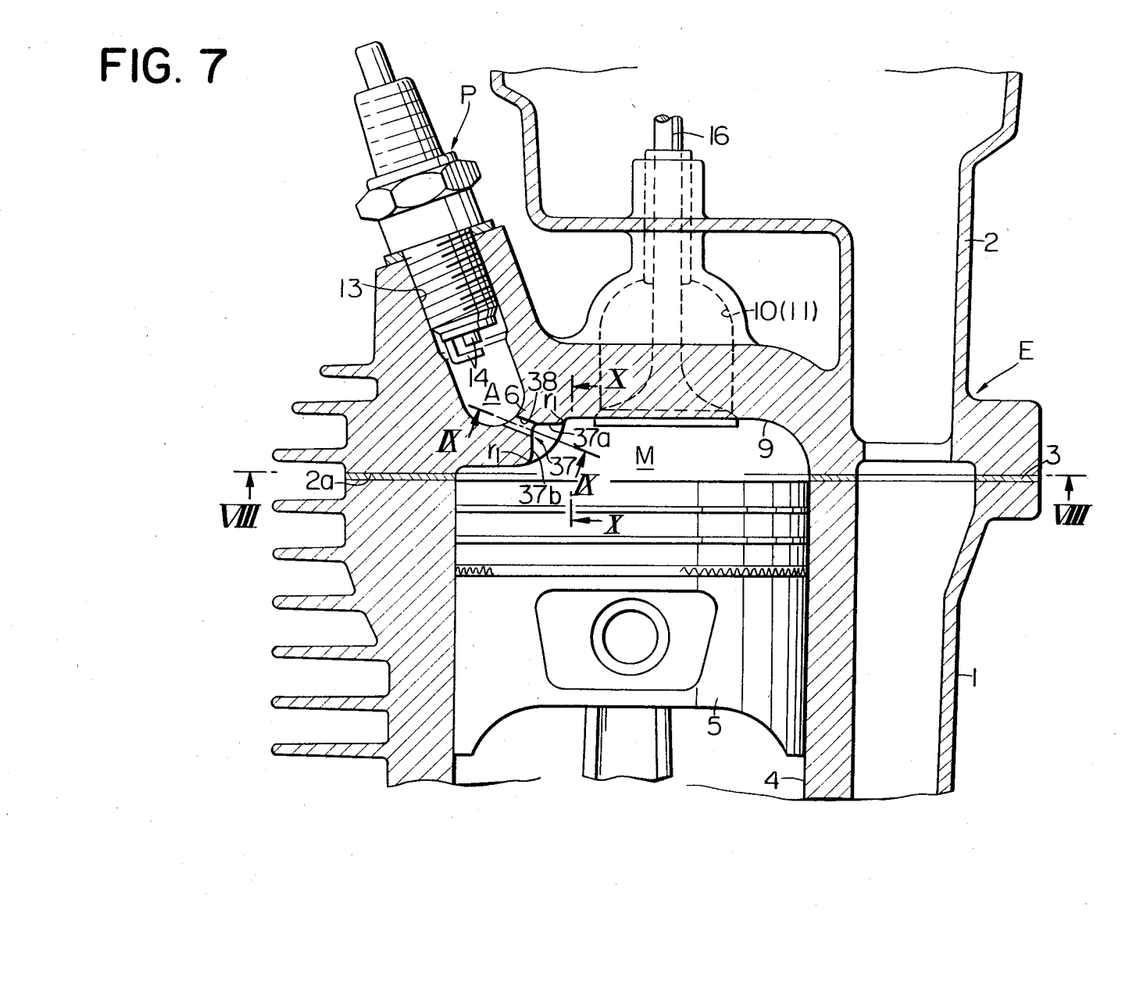
FIG. 7 is a side view in vertical section of a combustion chamber system of another modification of the first embodiment, wherein the plurality of communication holes in the first embodiment are replaced by one communication hole.
Figure 8:
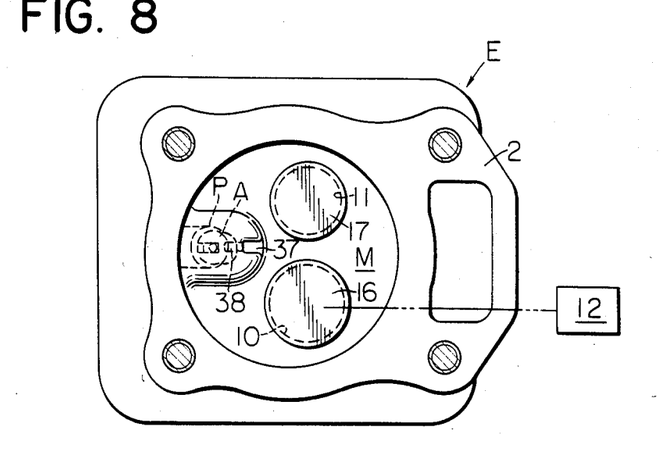
FIG. 8 is a bottom view of a cylinder head, taken along the line VIII—VIII in FIG. 7.
Figure 9:
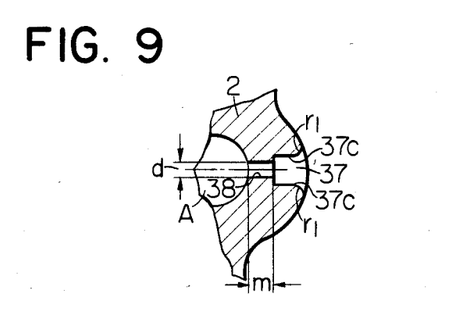
FIG. 9 is a sectional view taken along the line IX—IX in FIG. 7.
Figure 10:
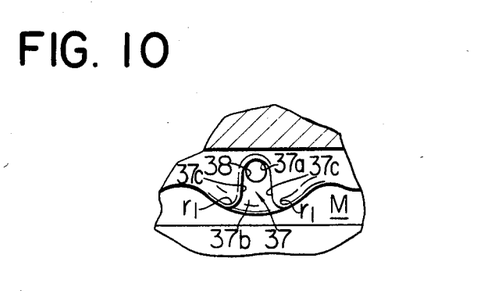
FIG. 10 is a sectional view taken along the line X—X in FIG. 7.

FIGS. 5 and 6 show a modification of the first embodiment shown in FIGS. 1 and 2. This modified embodiment is different from the first embodiment in the structure of an auxiliary combustion chamber $A_1$ but is quite the same in other arrangements as the first embodiment. Therefore, the same reference numerals and characters are used to indicate the corresponding parts.

In this modification, the auxiliary combustion chamber $A_1$ is defined by the wall of a cylindrical bottomed bore 24 made transversely on one side of the cylinder head 2 and a stop plug 25 screwed into the bottomed bore 24 at its open end through a packing. The auxiliary combustion chamber $A_1$ has a longitudinal bottom surface which is spherically shaped, and the longitudinal axis $l_1—l_1$ of the auxiliary chamber $A_1$ extends substantially horizontal and perpendicular to the longitudinal axis L—L of the cylinder 4. Above the auxiliary chamber $A_1$, there is formed a threaded bore 13 opening to the upper side of the chamber $A_1$. An ignition plug P is screwed into the threaded bore 13 and has an electrode 14 faced into the auxiliary combustion chamber $A_1$. The chamber $A_1$ extends to the interior of stop plug 25.

In the operation of the engine, a part of the air-fuel mixture drawn into the main combustion chamber M in the suction stroke is caused to flow into the auxiliary combustion chamber $A_1$ through the two communication holes 18 and 19 by the upward movement of the piston 5 in the subsequent compression stroke. At a point close to the completion of this compression stroke, the mixture near the electrode 14 within the auxiliary combustion chamber $A_1$ is fired by the spark ignition of ignition plug P, and a part of the resulting flame is immediately injected through the two communication holes 18 and 19 into the main combustion chamber M toward the upper surface of the piston 5 which is then located in the vicinity of the top dead center. At the same time, the flame within the auxiliary combustion chamber $A_1$ is propagated from the point close to the electrode 14 of the ignition plug P toward the inner and deepest wall portion of the auxiliary chamber $A_1$ to further remarkably raise the temperature in the auxiliary combustion chamber $A_1$, whereby the burnt gas continues to further expand. Consequently, the burnt gas of a high temperature is continuously and forcibly injected into the main combustion chamber M through the two communication holes 18 and 19 to spread over the outer parts of the main combustion chamber M across the shortest distance, thus burning the unburnt gas within the main combustion chamber M. In this manner, the combustion is extremely rapidly completed at an increased speed.

Thus, in this modification, the flame speed is increased to raise a combustion speed and the distance of flame propagation is shortened, which are primary factors for suppressing knocking. This makes it possible to provide a high power kerosine internal combustion engine having an improved specific fuel consumption.

FIGS. 7 to 10 show another modification of the embodiment shown in FIGS. 1 and 2, which has a modified combustion chamber, wherein like reference characters denote like parts. Incidentally, for convenience in description, one communication hole is provided in this modification.

In general, when employing a kerosine internal combustion engine including a combustion chamber system provided with main and auxiliary combustion chambers, it is a practice to integrally form the main and auxiliary combustion chambers in a cylinder head when the cylinder head is cast in a die cast or the like, and to then perforate a communication hole in a partition separating the main and auxiliary combustion chambers from each other, in order to allow a reduction in cost. In the perforation of the communication hole from the main combustion chamber, however, it is difficult to select a point of the communication hole to be perforated, and the mechanical working is costly, which are disadvantageous. Further, the partition has to be formed of a relatively large thickness for insuring the strength of the part thereof surrounding the communication hole to be perforated therein. With such an arrangement, there may arise some demerits that the communication hole is too long and so the flame flowing through the communication hole is cooled by the wall surface thereof and worst extinguished. To avoid these, it is considered to provide a divergent opening in a portion of the communication hole on the side of the main combustion chamber. In this case, however, a sharp edge may be formed on the wall surface of the communication hole and is apt to be a heat spot, resulting in another disadvantage of causing knocking.

This modification has been suggested to eliminate the above disadvantages. In the modification, a recess 37 is formed concave from the side of the main combustion chamber toward the side of the auxiliary combustion chamber. This recess 37 is simultaneously formed in the partition 6 when the casting is effected in a die cast for defining the main and auxiliary combustion chambers M and A. The recess 37 is opened in the wall of the main combustion chamber M, and a short communication hole 38 having a length of m is perforated from a deepest wall 37b of the recess 37 toward the auxiliary combustion chamber A by use of a tool such as a drill or the like, whereby the main and auxiliary combustion chambers M and A communicate with each other through the communication hole 38 and the recess 37.

A ceiling wall 37a of the recess 37 extends substantially parallel to a junction surface 2a of the cylinder head 2 on the side of the cylinder block 1, and the deepest wall 37b of the recess 37 is substantially perpendicular to the junction surface 2a. Opposed side walls 37c of the recess 37 extend substantially parallel to the longitudinal axis of the communication hole 38 and have drafts formed facing the main combustion chamber M for use in the casting process. The distance between the side walls 37c is slightly larger than the diameter d of the communication hole 38. A radius surface $r_1$ is formed on the peripheral edge of the open end of the recess 37 on the side of the main combustion chamber M, and provides a smooth connection between the wall surface of the recess 37 and the wall surface of the main combustion chamber M.

With these arrangements, in the combustion procedure during engine operation, the combustion flame from the auxiliary combustion chamber A passes through the short communication hole 38 to reach the recess 37, and then into the main combustion chamber M. Therefore, this flame is difficult to be cooled by the wall surface of the communication hole 38 when passing therethrough, thus getting rid of the possibility of the combustion flame being put out undesirably. In addition, since the open end of the recess 37 on the side of the main combustion chamber M is smoothly connected to the wall surface of the main combustion chamber M through the radius surface $r_1$ so that no sharp edge is formed, such open end has a good thermal conduction and is difficult to be a heat spot.

What is claimed is:

1. A combustion chamber system for an overhead valve type kerosine internal combustion engine, comprising: a cylinder head; a piston slidable in a cylinder; a main combustion chamber defined by a lower surface of a cylinder head and an upper surface of the piston; an auxiliary combustion chamber defined within said cylinder head and spaced from said main combustion chamber by a partition; a fuel feeding means for feeding an air-fuel mixture of a theoretical or richer fuel ratio to said main combustion chamber; a suction port and an exhaust port adapted to be opened and closed by suction and exhaust valves, respectively; an ignition plug provided to have an electrode thereof exposed to said auxiliary combustion chamber; and two communication holes formed in said partition to provide communication between said main and auxiliary combustion chambers, wherein respective open ends of said communication holes located on the side of the main combustion chamber are pointed to parts of an upper surface of the piston positioned near a top dead center thereof, said parts being located below said suction and exhaust valves, respectively, and wherein said auxiliary combustion chamber is defined by a wall surface of a bottomed bore formed on one side of said cylinder head and a stop plug for blocking an open end of said bottomed bore, and said electrode of the ignition plug is located in the auxiliary combustion chamber in close proximity to open ends of said communication holes in the partition wall of said auxiliary combustion chamber.

2. A combustion chamber system according to claim 1, wherein said auxiliary combustion chamber is formed extending substantially horizontal and perpendicular to an axis of said cylinder and said ignition plug is screwed into a threaded bore formed above the auxiliary combustion chamber, said threaded bore opening to an upper side of the auxiliary combustion chamber.

3. A combustion chamber system according to claim 1 or 2, wherein said electrode of the plug is located closer to said open ends of the communication holes on the side of said auxiliary combustion chamber than to inner deepest wall portion of the auxiliary combustion chamber.

4. A combustion chamber system according to claim 1, wherein said partition includes a recess made therein which is formed concave from said main combustion chamber toward said auxiliary combustion chamber, each of said communication holes is perforated from said recess, and a peripheral edge defining an open end of said recess on the side of the main combustion chamber is formed in a radius surface smoothly connected to a wall surface of said main combustion chamber.

5. A combustion chamber system according to claim 4, wherein said recess is formed simultaneously when the cylinder head is cast.

6. A combustion chamber system according to claim 4 or 5, wherein said recess comprises a ceiling wall extending substantially parallel to a junction surface of the cylinder head to be laid on a cylinder block, a deepest wall extending substantially perpendicular to said junction surface and a pair of opposed side walls, each of said communication holes being perforated from said deepest wall and having a diameter smaller than a distance between the opposed side walls.

7. A combustion chamber according to claim 1, wherein the communication holes are gradually widened and diverged toward said main combustion chamber and a distance between these holes are gradually increased toward the main combustion chamber.

8. A combustion chamber system for a side valve type kerosine internal combustion engine, comprising: a cylinder head; a piston slidable in a cylinder; a main combustion chamber defined by a lower surface of the cylinder head and an upper surface of the piston; and auxiliary combustion chamber defined within said cylinder head and spaced from said main combustion chamber by a partition; a fuel feeding means for feeding an air-fuel mixture of a theoretical or richer fuel ratio to said main combustion chamber; a suction port and an exhaust port adapted to be opened and closed by suction and exhaust valves, respectively; an ignition plug provided to have an electrode thereof exposed to said auxiliary combustion chamber; and two communication holes formed in said partition to provide communication between said main and auxiliary combustion chambers, wherein respective open ends of said communication holes located on the side of the main combustion chamber are pointed to an upper surface of the piston positioned at a top dead center thereof and are located below said suction and exhaust valves, respectively, and wherein said auxiliary combustion chamber is defined by a wall surface of a bottomed bore formed on one side of said cylinder head, and a stop plug for blocking an open end of said bottomed bore, and said electrode of the ignition plug is located in the auxiliary combustion chamber in close proximity to open ends of said communication holes in the partition of said auxiliary combustion chamber.

9. A combustion chamber system according to claim 8, wherein said auxiliary combustion chamber is formed extending substantially horizontal and perpendicular to an axis of said cylinder and said ignition plug is screwed into a threaded bore formed above the auxiliary combustion chamber, said threaded bore opening to an upper side of the auxiliary combustion chamber.

10. A combustion chamber system according to claim 8 or 9, wherein said electrode of the plug is located closer to said open ends of the communication holes on the side of said auxiliary combustion chamber than to inner deepest wall portion of the auxiliary combustion chamber.

11. A combustion chamber system according to claim 8, wherein said partition includes a recess made therein which is formed concave from said main combustion chamber toward said auxiliary combustion chamber, each of said communication holes is perforated from said recess, and a peripheral edge defining an open end of said recess on the side of the main combustion chamber is formed in a radius surface smoothly connected to a wall surface of said main combustion chamber.

12. A combustion chamber system according to claim 11, wherein said recess is formed simultaneously when the cylinder head is cast.

13. A combustion chamber system according to claim 11 or 12, wherein said recess comprises a ceiling wall extending substantially parallel to a junction surface of the cylinder head to be laid on a cylinder block, a deepest wall extending substantially perpendicular to said junction surface and a pair of opposed side walls, each of said communication holes being perforated from said deepest wall and having a diameter smaller than a distance between the opposed side walls.

14. A combustion chamber system according to claim 8, wherein the communication holes are gradually widened and diverged toward said main combustion chamber and a distance between these holes are gradually increased toward the main combustion chamber.

* * * * *